United States Patent
Park

(10) Patent No.: US 8,896,976 B2
(45) Date of Patent: Nov. 25, 2014

(54) INVERTER PROTECTION DEVICE

(71) Applicant: Samsung Electro-Mechanics Co., Ltd., Suwon, Gyunggi-do (KR)

(72) Inventor: Min Gyu Park, Gyunggi-do (KR)

(73) Assignee: Samsung Electro-Mechanics Co., Ltd., Suwon, Gyunggi-Do (KR)

( * ) Notice: Subject to any disclaimer, the term of this patent is extended or adjusted under 35 U.S.C. 154(b) by 85 days.

(21) Appl. No.: 13/780,784

(22) Filed: Feb. 28, 2013

(65) Prior Publication Data

US 2014/0177112 A1 Jun. 26, 2014

(30) Foreign Application Priority Data

Dec. 20, 2012 (KR) .................. 10-2012-0149346

(51) Int. Cl.
*H02H 9/00* (2006.01)
*H02H 3/08* (2006.01)
*H02H 3/20* (2006.01)
*H02H 9/04* (2006.01)

(52) U.S. Cl.
CPC .................................... *H02H 3/08* (2013.01)
USPC ............................ 361/56; 361/91.1; 361/91.2

(58) Field of Classification Search
USPC ............................................................ 361/56
See application file for complete search history.

(56) References Cited

U.S. PATENT DOCUMENTS

| 4,310,866 | A * | 1/1982 | Wirth | 361/88 |
| 7,372,677 | B2 * | 5/2008 | Kishibata et al. | 361/42 |
| 7,489,531 | B2 * | 2/2009 | Mehta | 363/56.03 |
| 2007/0291426 | A1 * | 12/2007 | Kasunich et al. | 361/33 |
| 2009/0079191 | A1 * | 3/2009 | Mari et al. | 290/43 |
| 2013/0051099 | A1 * | 2/2013 | Tateyama et al. | 363/97 |

FOREIGN PATENT DOCUMENTS

| KR | 10-2000-0001632 A | 1/2000 |
| KR | 10-2006-0093983 A | 8/2006 |

* cited by examiner

*Primary Examiner* — Dharti Patel
(74) *Attorney, Agent, or Firm* — McDermott Will & Emery LLP

(57) ABSTRACT

There is provide an inverter protection device including: a reference voltage obtaining unit obtaining a reference voltage signal based on output current from an inverter module; a filtering unit removing noise from the reference voltage signal to output the filtered signal; a sensing unit sensing the filtered signal through a sensing terminal; an electrostatic discharge diode provided between the sensing terminal and a ground; and a bypass unit provided between one terminal of the electrostatic discharge diode and the ground.

21 Claims, 7 Drawing Sheets

INVERTER PROTECTION DEVICE

CROSS-REFERENCE TO RELATED APPLICATIONS

This application claims the priority of Korean Patent Application No. 10-2012-0149346 filed on Dec. 20, 2012, in the Korean Intellectual Property Office, the disclosure of which is incorporated herein by reference.

BACKGROUND OF THE INVENTION

1. Field of the Invention

The present invention relates to an inverter protection device, and particularly, to an inverter protection device capable of preventing malfunctioning thereof due to noise.

2. Description of the Related Art

Recently, due to general increases in power usage, there is concern about electrical power reserve rates, and thus, demand for high efficiency devices has gradually increased. Particularly, as demand on electricity supplies by devices such as air-conditioners or the like has rapidly increased over time, there is concern that demand for power may outstrip amounts of power able to be supplied. Further, recognition of the above-mentioned concern has been widespread both domestically and internationally.

Therefore, governments have introduced government subsidy programs according to efficiency grades of three major appliances. In addition, manufacturers of the major appliances have employed various technologies in order to develop and produce products coinciding with government energy efficiency policies. For example, a method of operating a motor driving circuit according to the related art has evolved to a pulse width modulation (PWM) motor controlling method employing an inverter, such that products having improved energy efficiency have been widely produced.

An inverter may refer to all devices converting direct current into alternating current. For example, an inverter may be used in a device for controlling and driving a motor.

According to the related art, inverters have been configured by using switching elements such as an insulated gate bipolar transistor (IGBT), a metal-oxide-semiconductor field-effect transistor (MOSFET) and a gate driver as separate unit elements. However, since a degree of integration of a circuit and a package has been improved at present, a single package in which all separate unit elements are integrated has been used.

An inverter module may drive and control a motor using a PWM signal. Further, an inverter module may monitor current flowing within each switching element. Based on the monitored currents, it may be determined as to whether a duty ratio of the PWM signal should be increased or decreased.

Meanwhile, in order to detect the current flowing in the switching element included in the inverter module, a current detection resistor (a shunt resistor) provided between the switching element and a ground at a low side of the inverter is commonly used. Based on voltage applied to both ends of the current detection resistor and reference voltage, an overcurrent state may be determined and destruction of the switching element may be prevented.

Meanwhile, when switching noise, lightning surge voltage from the outside, static electricity, or the like are applied to a circuit, a configuration in which the inverter circuit is protected and malfunctioning does not occur has been demanded.

Patent Document 1 described in the following related art document relates to an overcurrent detection circuit of an inverter, but fails to disclose a configuration for protecting against malfunctioning due to lightning surge voltage from the outside, static electricity, and the like.

RELATED ART DOCUMENT (Patent Document 1) Korean Patent Laid-Open Publication No. 2000-001632

SUMMARY OF THE INVENTION

An aspect of the present invention provides an inverter protection device capable of preventing malfunctioning due to noise.

According to an aspect of the present invention, there is provided an inverter protection device, including: a reference voltage obtaining unit obtaining a reference voltage signal based on output current from an inverter module; a filtering unit removing noise from the reference voltage signal to output the filtered signal; a sensing unit sensing the filtered signal through a sensing terminal; an electrostatic discharge diode provided between the sensing terminal and a ground; and a bypass unit provided between one terminal of the electrostatic discharge diode and the ground.

The reference voltage obtaining unit may include: a voltage sensing unit obtaining output voltage based on the output current from the inverter module; and a level adjusting unit adjusting a level of the output voltage.

The reference voltage obtaining unit may further include a combining unit combining a plurality of output voltages.

The level adjusting unit may include a plurality of resistor elements distributing the output voltage.

The filtering unit may include an RC filter.

The bypass unit may include at least one diode element.

The diode element may have forward voltage of at least 0.7V.

According to another aspect of the present invention, there is provided an inverter protection device, including: a reference voltage obtaining unit obtaining a reference voltage signal based on output current from an inverter module; a filtering unit removing noise from the reference voltage signal to output the filtered signal; a sensing unit sensing the filtered signal through a sensing terminal; an electrostatic discharge diode provided between the sensing terminal and a ground; and a bypass unit electrically connected to the electrostatic discharge diode and clamping voltage applied through the electrostatic discharge diode.

The reference voltage obtaining unit may include: a voltage sensing unit obtaining output voltage based on the output current from the inverter module; and a level adjusting unit adjusting a level of the output voltage.

The reference voltage obtaining unit may further include a combining unit combining a plurality of output voltages.

The level adjusting unit may include a plurality of resistor elements distributing the output voltage.

The filtering unit may include an RC filter.

The bypass unit may include at least one diode element.

The diode element may have forward voltage of at least 0.7V.

According to another aspect of the present invention, there is provided an inverter protection device, including: a reference voltage obtaining unit obtaining a reference voltage signal based on output current from an inverter module; a filtering unit removing noise from the reference voltage signal to output the filtered signal; a sensing unit sensing the filtered signal through a sensing terminal; an electrostatic discharge diode provided between the sensing terminal and a ground; and a bypass unit bypassing a signal from the electrostatic discharge diode.

The reference voltage obtaining unit may include: a voltage sensing unit obtaining output voltage based on the output current from the inverter module; and a level adjusting unit adjusting a level of the output voltage.

The reference voltage obtaining unit may further include a combining unit combining a plurality of output voltages.

The level adjusting unit may include a plurality of resistor elements distributing the output voltage.

The filtering unit may include an RC filter.

The bypass unit may include at least one diode element.

The diode element may have forward voltage of at least 0.7V.

BRIEF DESCRIPTION OF THE DRAWINGS

The above and other aspects, features and other advantages of the present invention will be more clearly understood from the following detailed description taken in conjunction with the accompanying drawings, in which:

FIGS. 3A and 3B are views showing a state in which external noise is introduced into the current detection circuit, wherein FIG. 3A shows charge and discharge paths when the external noise is introduced and FIG. 3B shows a switching operation signal waveform according to voltage applied to a sensing terminal;

FIGS. 5A and 5B are views showing a state in which external noise is introduced into the inverter protection device according to the embodiment of the present invention, wherein FIG. 5A shows charge and discharge paths when the external noise is introduced and FIG. 5B shows a switching operation signal waveform according to voltage applied to a sensing terminal.

DETAILED DESCRIPTION OF THE EMBODIMENTS

Figure 1:
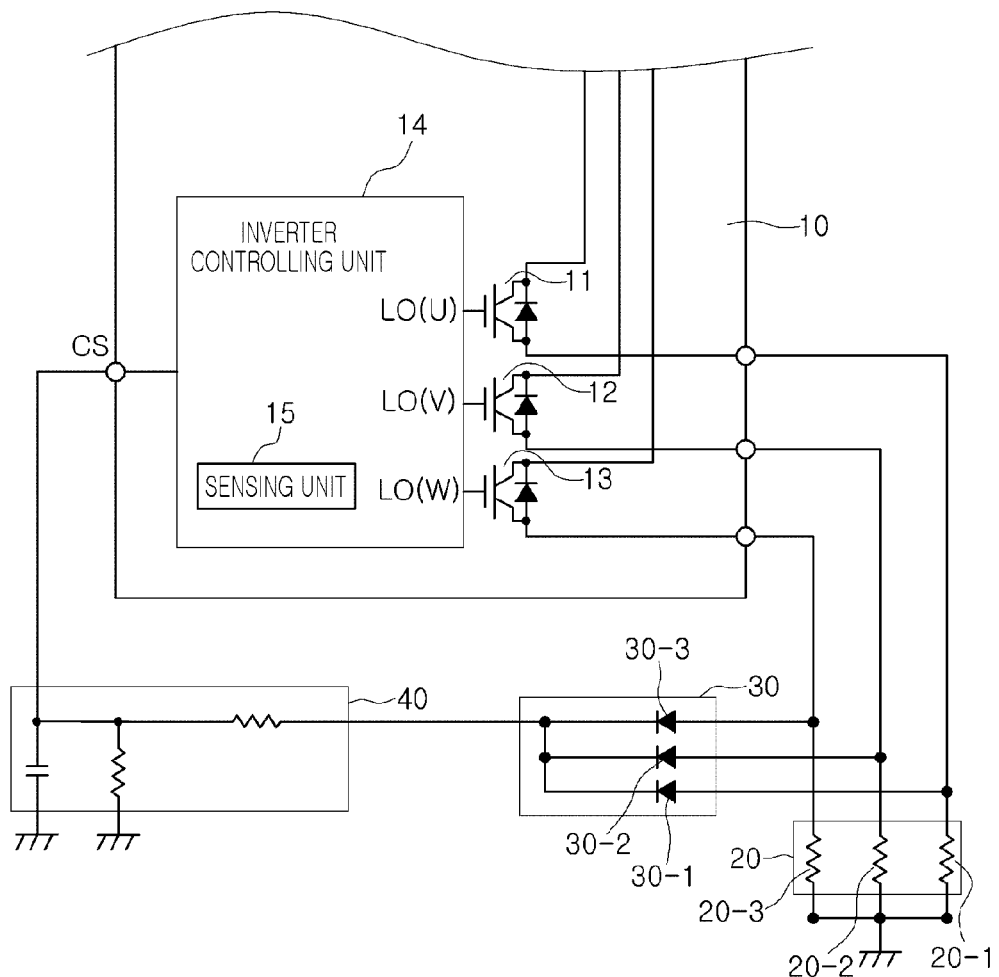
FIG. 1 is a view showing an inverter module and a current detection circuit.

Hereinafter, embodiments of the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art.

In the drawings, the same or like reference numerals will be used to designate the same or like elements.

FIG. 1 is a view showing an inverter module and a current detection circuit.

Referring to FIG. 1, an inverter module 10 may include an inverter controlling unit 14, switching elements 11, 12, and 13, and a sensing unit 15.

The inverter controlling unit 14 may control the driving of the switching elements 11, 12, and 13.

The switching elements 11, 12, and 13 may be low side switching elements configuring an inverter circuit. Emitter terminals of the switching elements 11, 12, and 13 may be connected to current detection resistors 20, respectively. That is, the current detection resistors may be connected between the respective switching elements 11, 12, and 13 and a ground.

The sensing unit 15 may obtain electrical information measured in a current detection circuit.

Meanwhile, the current detection circuit may include the current detection resistor 20, a switching diode unit 30, and a noise reduction filter 40.

A first current detection resistor 20-1 may be connected to an emitter terminal of a first low side switching element 11. Therefore, output voltage may be applied to both ends of the first current detection resistor 20-1 by current flowing in the first current detection resistor 20-1.

In addition, a second current detection resistor 20-2 may be connected to an emitter terminal of a second low side switching element 12. Therefore, output voltage may be applied to both ends of the second current detection resistor 20-2 by current flowing in the second current detection resistor 20-2.

In addition, a third current detection resistor 20-3 may be connected to an emitter terminal of a third low side switching element 13. Therefore, output voltage may be applied to both ends of the third current detection resistor 20-3 by current flowing in the third current detection resistor 20-3.

The above-mentioned configuration is generally used in detecting the current in each phase at low costs.

The switching diode unit 30 may include diode elements 30-1, 30-2, and 30-3 corresponding to the current detection resistors 20-1, 20-2, and 20-3, respectively. Meanwhile, respective output voltages obtained by the current detection resistors 20-1, 20-2, and 20-3 may be combined by the switching diode unit 30. That is, the sum of the output voltages may be measured at an output terminal of the switching diode unit 30.

The noise reduction filter 40 may include an RC filter and may remove noise from the output voltage combined by the switching diode unit 30. Further, the noise reduction filter 40 may transfer the output voltage to the sensing unit 15 through a sensing terminal CS.

Meanwhile, the inverter controlling unit 14 may compare the output voltage obtained by the sensing unit 15 with a reference voltage to thereby turn off the switching elements 11, 12, and 13. Meanwhile, the reference voltage refers to a reference value for determining an overcurrent state. Therefore, in the case of an overcurrent state, the output voltage obtained by the sensing unit 15 is larger than the reference voltage.

In the overcurrent state, the switching elements 11, 12, and 13 are turned off, such that destruction of the switching elements 11, 12, and 13 may be prevented.

In general, voltage of 300V or more is applied to both ends of a switching element of an inverter module and current of several amperes (A) or more flows through the switching element. Therefore, when the switching element repeats switching on and off operations, noise may be increased due to a parasitic component of a PCB pattern. In addition, an abnormal signal may be applied to a sensing terminal by external noise due to lightning surge voltage, static electricity, and the like. In this case, the inverter controlling unit 14 may incorrectly recognize the state of the inverter module as an overcurrent state. In the case in which the inverter controlling unit 14 incorrectly recognizes the state of the inverter module as the overcurrent state, the driving of the inverter module is stopped.

The lightning surge voltage from the outside and electrostatic voltage may be from tens of volts to hundreds of volts even for a short period of time. Therefore, a configuration for preventing malfunctioning due to the above-mentioned noise is required.

Figure 2:
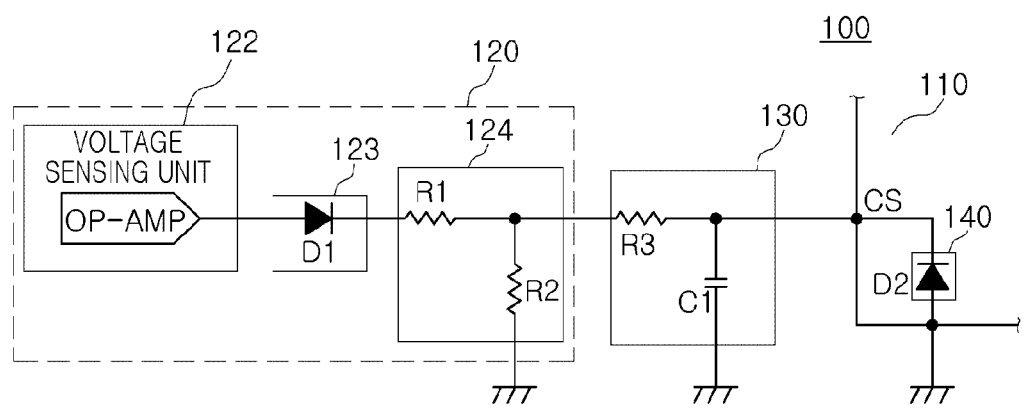
FIG. 2 is a view showing a current detection circuit.

FIG. 2 is a view showing a current detection circuit.

Referring to FIG. 2, the current detection circuit may include a reference voltage obtaining unit 120, a filtering unit 130, and an electrostatic discharge diode 140.

The reference voltage obtaining unit 120 may include a voltage sensing unit 122, a combining unit 123, and a level adjusting unit 124.

The voltage sensing unit 122 may include sensing resistors. The sensing resistors may convert current from the inverter module into voltage. For example, the sensing resistors may correspond to the current detection resistors 20-1, 20-2, and 20-3 of FIG. 1.

Further, the voltage sensing unit 122 may include an operational amplifier (OP-AMP). The amplifier (OP-AMP) may amplify the voltages obtained by the sensing resistors.

The combining unit 123 may combine the voltages obtained by the sensing resistors connected to the switching elements of the inverter module, respectively.

For example, the combining unit 123 may include a switching diode D1. The switching diode D1 may transfer the voltage from the voltage sensing unit 122 to an output terminal of the combining unit.

FIG. 2 shows the voltage sensing unit 122 and the switching diode D1 for each phase of the inverter. Voltages for respective phases may be combined at the output terminal of the combining unit by the switching diode.

The level adjusting unit 124 may adjust the output voltage from the combining unit 123 to be a predetermined level. To this end, the level adjusting unit 124 may include a plurality of resistor elements R1 and R2 for distributing the output voltage of the combining unit.

The filtering unit 130 may perform a noise filtering operation with respect to the output voltage from the reference voltage obtaining unit. For example, the filtering unit 130 may remove noise from the reference voltage to thereby output a filtered signal. The filtered signal refers to output of the filtering unit 130.

Meanwhile, the filtering unit 130 may include an RC filter including a resistor element R3 and a capacitor element C1.

The output of the filtering unit 130 may be input to a sensing terminal CS.

The sensing unit and the inverter controlling unit may be connected to the sensing terminal CS.

By the above-mentioned method, the inverter controlling unit may obtain inverter current.

In a normal state, when a parasitic component occurring at a PCB is small, the driving of the inverter module may not be problematic. However, in the case in which noise is introduced from the outside, the voltage level measured at the sensing terminal CS may be higher than the reference voltage. The reference voltage may be a criterion in determining a normal state of the inverter current. Therefore, in the case in which the external noise is introduced, the voltage level measured at the sensing terminal CS is higher than the reference voltage, such that the inverter module may not normally operated.

Figure 3A:
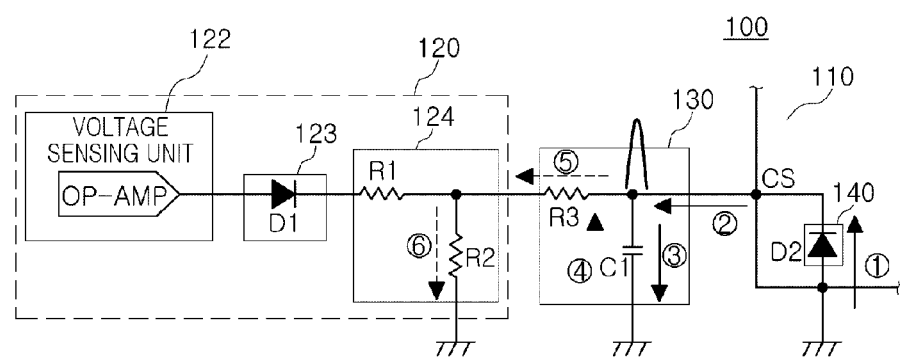
Figure 3B:
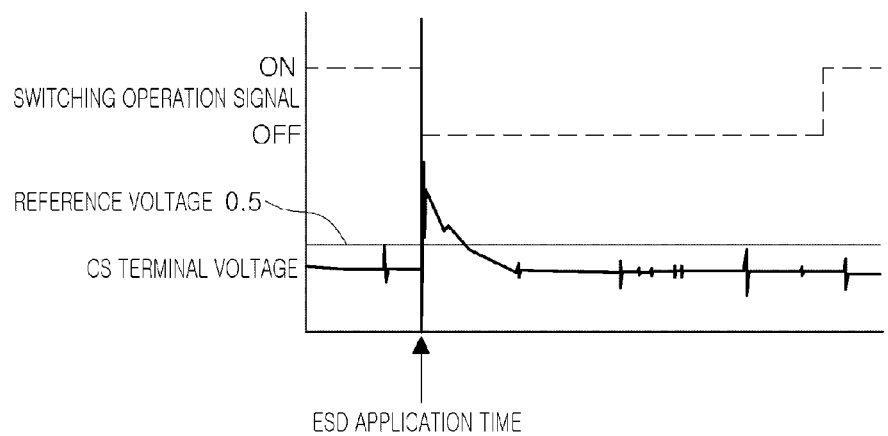

FIGS. 3A and 3B are views showing a state in which external noise is introduced into the current detection circuit, wherein FIG. 3A shows charge and discharge paths when the external noise is introduced and FIG. 3B shows a switching operation signal waveform according to voltage applied to the sensing terminal.

Referring to FIG. 3A, the switching noise due to the external noise or a continuous switching operation of the switching element may be applied to the current detection circuit through the ground.

For example, the noise may be introduced into the current detection circuit through the electrostatic discharge diode 140 (①).

The noise introduced into the current detection circuit may be stored in the capacitor element C1 through predetermined paths (② and ③).

Next, when the introduction of the noise is stopped, energy charged in the capacitor element C1 may be discharged through predetermined paths (④, ⑤, and ⑥).

FIG. 3B is a view showing a switching operation signal waveform according to voltage applied to the sensing terminal CS.

The present embodiment will be described, assuming that capacitance of the capacitor element C1 is 1 nF, resistance of the resistor element R3 is 2 kΩ, resistance of the resistor element R2 is 1.62 kΩ, and resistance of the resistor element R1 is 6.8 kΩ.

In the case in which predetermined noise is introduced and the capacitor element C1 is charged through the paths (①, ②, and ③), discharge resistance (R2+R3) is 3.62Ω and the capacitance of the capacitor element C1 is 1 nF, and thus, a discharge time τ may be 3.62 μs. That is, the charged capacitor element C1 may be discharged in 3.62 seconds.

Generally, in the case in which voltage higher than a predetermined reference voltage is maintained for a predetermined time or more, an overcurrent protection operation may be converted into an active state. In the case in which the overcurrent protection operation is converted into the active state, the switching operation is stopped, and thus an operation of the inverter module is stopped.

For example, referring to FIG. 3B, it may be confirmed that a reference voltage is 0.5V and a voltage higher than the reference voltage is detected for a predetermined time or more at the sensing terminal CS, and thus a switching operation signal is switched off. That is, it may be confirmed that the malfunctioning of the inverter module due to the noise occurs.

Therefore, a configuration for suppressing malfunctioning due to the noise needs to be provided.

Figure 4:
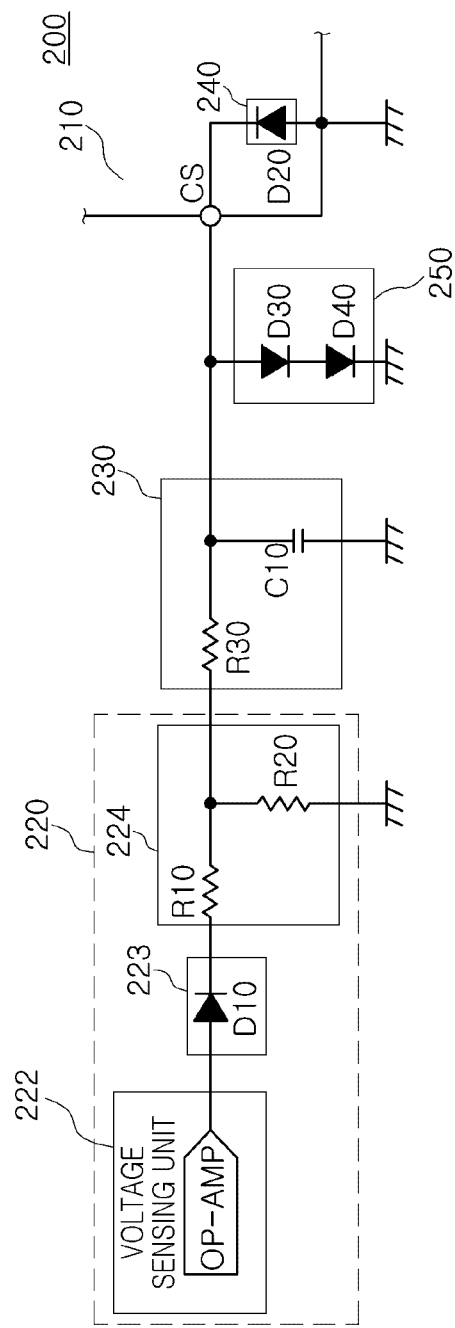
FIG. 4 is a view showing an inverter protection device according to an embodiment of the present invention.

FIG. 4 is a view showing an inverter protection device according to an embodiment of the present invention.

Referring to FIG. 4, the inverter protection device may include a reference voltage obtaining unit 220, a filtering unit 230, an electrostatic discharge diode 240, a bypass unit 250, and a sensing unit.

The reference voltage obtaining unit 220 may obtain a reference voltage signal based on current output from the inverter module. The reference voltage signal refers to voltage output from the reference voltage obtaining unit 220.

The reference voltage obtaining unit 220 may include a voltage sensing unit 222, a combining unit 223, and a level adjusting unit 224.

The voltage sensing unit 222 may obtain output voltage based on the output current from the inverter module.

The voltage sensing unit 222 may include sensing resistors. The sensing resistors may convert the current from the inverter module into voltage. For example, the sensing resistors may correspond to the current detection resistors 20-1, 20-2, and 20-3 of FIG. 1.

Further, the voltage sensing unit 222 may include an operational amplifier (OP-AMP). The amplifier (OP-AMP) may amplify the voltages obtained by the sensing resistors.

The combining unit 223 may combine the voltages obtained by the sensing resistors connected to the switching elements of the inverter module, respectively. Here, the voltages obtained by the sensing resistors refer to voltage output from the inverter module.

For example, the combining unit 223 may include a switching diode D10. The switching diode D10 may transfer the voltage from the voltage sensing unit 222 to an output terminal of the combining unit 223.

FIG. 4 shows the voltage sensing unit 222 and the switching diode D10 for each phase of the inverter. Voltages for respective phases may be combined at the output terminal of the combining unit by the switching diode.

The level adjusting unit 224 may adjust output voltage from the combining unit 223 to be a predetermined level. To this end, the level adjusting unit 224 may include a plurality of resistor elements R10 and R20 for distributing the output voltage of the combining unit.

The filtering unit 230 may perform a noise filtering operation with respect to the output voltage from the reference voltage obtaining unit. For example, the filtering unit 230 may remove noise from the reference voltage signal to thereby output a filtered signal. The filtered signal refers to output of the filtering unit 230.

Meanwhile, the filtering unit 230 may include an RC filter including a resistor element R30 and a capacitor element C10.

The output of the filtering unit 230 may be input to a sensing terminal CS.

The sensing unit and the inverter controlling unit may be connected to the sensing terminal CS.

The sensing unit may sense the filtered signal through the sensing terminal.

By the above-mentioned method, the inverter controlling unit may obtain inverter current.

The electrostatic discharge diode 240 may be formed between the sensing terminal CS and a ground. The electrostatic discharge diode 240 may perform an electrostatic discharge protection function.

Meanwhile, the bypass unit 250 may be provided between one terminal of the electrostatic discharge diode D20 and the ground.

Further, the bypass unit 250 may be electrically connected to the electrostatic discharge diode D20 and may clamp voltage applied through the electrostatic discharge diode D20.

Further, the bypass unit 250 may bypass a signal from the electrostatic discharge diode D20.

The bypass unit 250 may include a diode element. Further, an anode of the diode may be connected to the sensing terminal CS, and a cathode of the diode may be connected to the ground.

Further, the bypass unit 250 may include a plurality of diode elements. For example, the bypass unit 250 may include two diode elements D30 and D40. The diode elements D30 and D40 may be connected to one another in series.

The diode element may clamp abnormal voltage introduced due to the noise. In this case, the diode element may significantly decrease the voltage charged in the capacitor element C10. In consideration of a general usage environment of the inverter module, forward voltage of the diode element may be at least 0.7V.

Figure 5A:
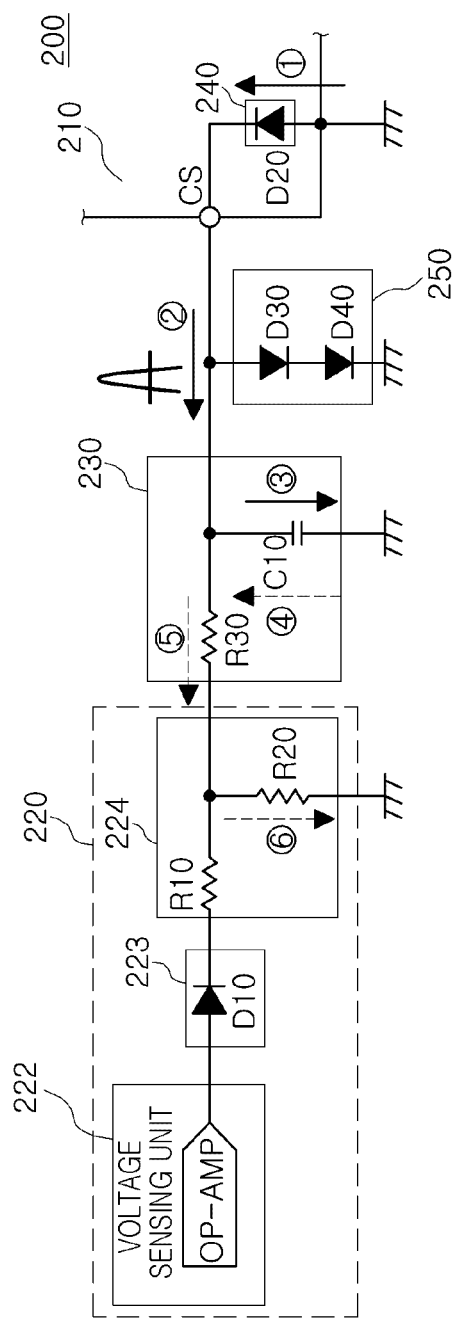
Figure 5B:
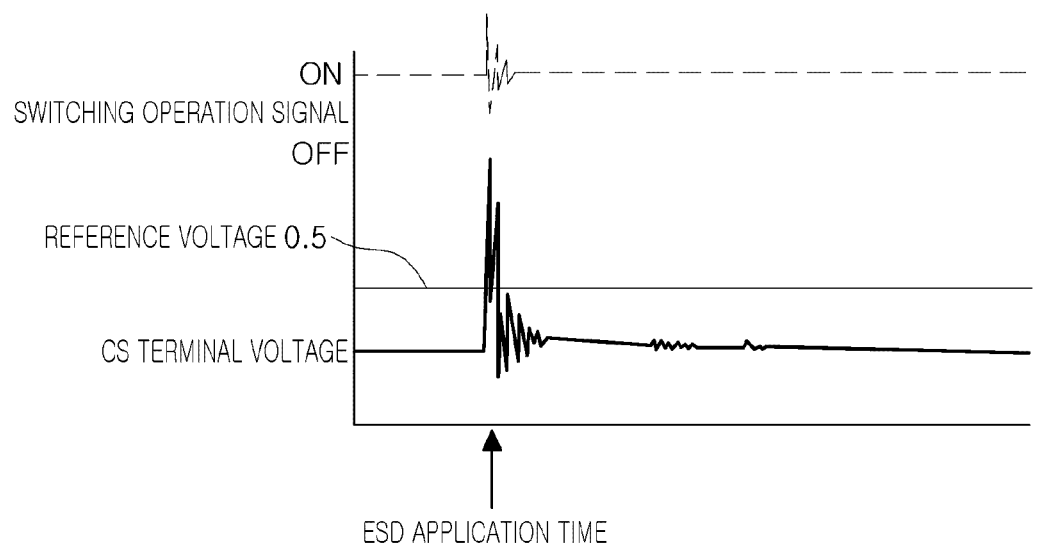

FIGS. 5A and 5B are views showing a state in which external noise is introduced into the inverter protection device according to the embodiment of the present invention, wherein FIG. 5A shows charge and discharge paths when the external noise is introduced and FIG. 5B shows a switching operation signal waveform according to voltage applied to the sensing terminal.

Referring to FIG. 5A, the switching noise due to the external noise or a continuous switching operation of the switching element may be applied to the inverter protection device through the ground.

For example, the noise may be introduced into the inverter protection device through the electrostatic discharge diode 240 (①).

The noise introduced into the inverter protection device may be stored in the capacitor element C10 through predetermined paths (② and ③). In this case, the bypass unit 250 may clamp the voltage applied through the paths (② and ③). Alternatively, the bypass unit 250 may bypass the voltage applied through the paths (② and ③).

The voltage charged in the capacitor element C10 may be significantly decreased by the bypass unit as compared to a magnitude of the noise.

Next, when the introduction of the noise is stopped, energy charged in the capacitor element C10 may be discharged through predetermined paths (④, ⑤, and ⑥).

In this case, since the voltage charged in the capacitor element C10 is decreased, a discharge time may also be significantly decreased.

Therefore, the inverter protection device according to the embodiment of the present invention may prevent malfunctioning due to the noise.

FIG. 5B is a view showing a switching operation signal waveform according to voltage applied to the sensing terminal CS.

The present embodiment will be described, assuming that capacitance of the capacitor element C10 is 1 nF, resistance of the resistor element R30 is 2 kΩ, resistance of the resistor element R20 is 1.62 kΩ, and resistance of the resistor element R10 is 6.8 kΩ.

Referring to FIGS. 3B and 5B, it may be confirmed that a time for which voltage higher than a reference voltage is applied to the sensing terminal CS is significantly shortened in the embodiment of FIG. 5B. Therefore, the switching operation signal may continuously maintain an on-state. That is, it may be confirmed that malfunctioning due to the noise may not occur in the present embodiment.

Figure 6:
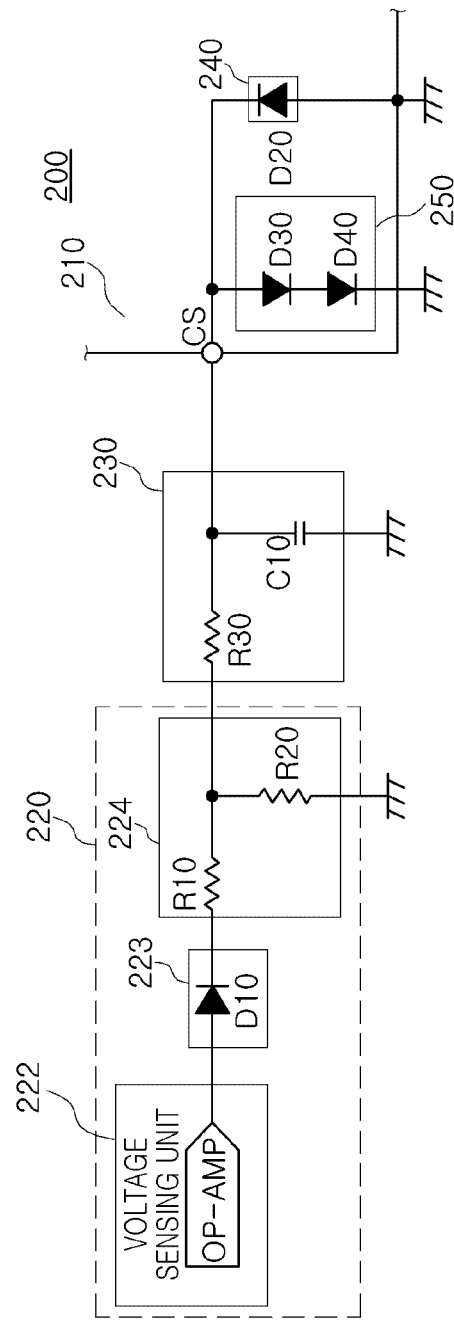
FIG. 6 is a view showing an inverter protection device according to another embodiment of the present invention.

FIG. 6 is a view showing an inverter protection device according to another embodiment of the present invention.

Here, since respective elements perform the same functions as the above-mentioned functions, a detailed description thereof will be omitted.

Referring to FIG. 6, the bypass unit 250 may be disposed in the inverter module.

That is, the bypass unit 250 may prevent malfunctioning due to the noise inside the inverter module.

As set forth above, according to embodiments of the present invention, an inverter protection device capable of preventing malfunctioning due to noise may be provided.

While the present invention has been shown and described in connection with the embodiments, it will be apparent to those skilled in the art that modifications and variations can be made without departing from the spirit and scope of the invention as defined by the appended claims.

What is claimed is:

1. An inverter protection device, comprising:
    a reference voltage obtaining unit obtaining a reference voltage signal based on output current from an inverter module;
    a filtering unit removing noise from the reference voltage signal to output the filtered signal;

a sensing unit sensing the filtered signal through a sensing terminal;

an electrostatic discharge diode provided between the sensing terminal and a ground; and a bypass unit provided between one terminal of the electrostatic discharge diode and the ground.

2. The device of claim 1, wherein the reference voltage obtaining unit includes:

a voltage sensing unit obtaining output voltage based on the output current from the inverter module; and a level adjusting unit adjusting a level of the output voltage.

3. The device of claim 2, wherein the reference voltage obtaining unit further includes a combining unit combining a plurality of output voltages.

4. The device of claim 2, wherein the level adjusting unit includes a plurality of resistor elements distributing the output voltage.

5. The device of claim 1, wherein the filtering unit includes an RC filter.

6. The device of claim 1, wherein the bypass unit includes at least one diode element.

7. The device of claim 6, wherein the diode element has forward voltage of at least 0.7V.

8. An inverter protection device, comprising:

a reference voltage obtaining unit obtaining a reference voltage signal based on output current from an inverter module;

a filtering unit removing noise from the reference voltage signal to output the filtered signal;

a sensing unit sensing the filtered signal through a sensing terminal;

an electrostatic discharge diode provided between the sensing terminal and a ground; and a bypass unit electrically connected to the electrostatic discharge diode and clamping voltage applied through the electrostatic discharge diode.

9. The device of claim 8, wherein the reference voltage obtaining unit includes:

a voltage sensing unit obtaining output voltage based on the output current from the inverter module; and a level adjusting unit adjusting a level of the output voltage.

10. The device of claim 9, wherein the reference voltage obtaining unit further includes a combining unit combining a plurality of output voltages.

11. The device of claim 9, wherein the level adjusting unit includes a plurality of resistor elements distributing the output voltage.

12. The device of claim 8, wherein the filtering unit includes an RC filter.

13. The device of claim 8, wherein the bypass unit includes at least one diode element.

14. The device of claim 13, wherein the diode element has forward voltage of at least 0.7V.

15. An inverter protection device, comprising:

a reference voltage obtaining unit obtaining a reference voltage signal based on output current from an inverter module;

a filtering unit removing noise from the reference voltage signal to output the filtered signal;

a sensing unit sensing the filtered signal through a sensing terminal;

an electrostatic discharge diode provided between the sensing terminal and a ground; and a bypass unit bypassing a signal from the electrostatic discharge diode.

16. The device of claim 15, wherein the reference voltage obtaining unit includes:

a voltage sensing unit obtaining output voltage based on the output current from the inverter module; and a level adjusting unit adjusting a level of the output voltage.

17. The device of claim 16, wherein the reference voltage obtaining unit further includes a combining unit combining a plurality of output voltages.

18. The device of claim 16, wherein the level adjusting unit includes a plurality of resistor elements distributing the output voltage.

19. The device of claim 15, wherein the filtering unit includes an RC filter.

20. The device of claim 15, wherein the bypass unit includes at least one diode element.

21. The device of claim 20, wherein the diode element has forward voltage of at least 0.7V.

* * * * *